United States Patent
Kronewitter, III et al.

(10) Patent No.: US 10,924,939 B2
(45) Date of Patent: Feb. 16, 2021

(54) SYSTEM AND METHOD FOR PERTURBED GEOLOCATION MODEL AND ORIENTATION MODEL NETWORK SIMULATION

(71) Applicant: Fuse Integration, Inc., San Diego, CA (US)

(72) Inventors: Frank Dell Kronewitter, III, San Diego, CA (US); Sumner H. Lee, San Diego, CA (US)

(73) Assignee: Fuse Integration, Inc., San Diego, CA (US)

(*) Notice: Subject to any disclaimer, the term of this patent is extended or adjusted under 35 U.S.C. 154(b) by 0 days.

(21) Appl. No.: 16/565,152

(22) Filed: Sep. 9, 2019

(65) Prior Publication Data

US 2020/0084638 A1 Mar. 12, 2020

Related U.S. Application Data

(60) Provisional application No. 62/729,842, filed on Sep. 11, 2018.

(51) Int. Cl.
*H04W 16/22* (2009.01)
*H04W 24/06* (2009.01)
(Continued)

(52) U.S. Cl.
CPC ......... *H04W 16/22* (2013.01); *H04L 41/0869* (2013.01); *H04W 16/18* (2013.01); *H04W 24/06* (2013.01)

(58) Field of Classification Search
CPC ..... H04W 16/22; H04W 16/18; H04W 16/28; H04W 16/12; H04W 24/06; H04W 24/04; H04L 41/0869
See application file for complete search history.

(56) References Cited

U.S. PATENT DOCUMENTS 8,072,992 B2 12/2011 Deal et al.
8,380,482 B2 2/2013 Zhu et al.
(Continued)

OTHER PUBLICATIONS

Thin et al., "GPS Systems Literature: Inaccuracy Factors and Effective Solutions", International Journal of Computer Networks & Communications (IJCNC) vol. 8, No. 2, Mar. 2016.

*Primary Examiner* — Candal Elpenord
(74) *Attorney, Agent, or Firm* — Procopio, Cory, Hargreaves & Savitch LLP

(57) ABSTRACT

Systems and methods for validating a configuration-dependent algorithm of a network device under test (DUT) within a simulated wireless environment are provided. The method can include transmitting idealized configuration information to a first DUT, including at least one of zero-error geolocation information and zero-error orientation information. The method can include monitoring first data transmissions between the first DUT and a second DUT based on the idealized configuration information. The method can include determining a first link quality based on the first data transmissions. The method can include transmitting perturbed configuration information to the first DUT and determining a second link quality between the first DUT and the second DUT based on the perturbed configuration information. The method can also include evaluating the wireless system based on a comparison of the first link quality and the second link quality.

20 Claims, 4 Drawing Sheets

(51) Int. Cl.
    *H04L 12/24*     (2006.01)
    *H04W 16/18*     (2009.01)

(56) References Cited

U.S. PATENT DOCUMENTS

| | | | |
|---|---|---|---|
| 9,991,592 B1* | 6/2018 | Rowell | H01Q 3/267 |
| 2012/0122406 A1* | 5/2012 | Gregg | H04W 24/06 |
| | | | 455/67.11 |
| 2013/0093447 A1* | 4/2013 | Nickel | H04W 24/06 |
| | | | 324/750.16 |
| 2013/0178203 A1* | 7/2013 | Venkataraman | H04W 4/16 |
| | | | 455/423 |
| 2017/0187109 A1* | 6/2017 | Wang | H01Q 3/36 |
| 2018/0027434 A1* | 1/2018 | Foegelle | H04B 7/0617 |
| | | | 455/67.13 |
| 2019/0356397 A1* | 11/2019 | DaSilva | G01R 29/10 |
| 2020/0064432 A1* | 2/2020 | Wong | H04W 16/28 |

\* cited by examiner

SYSTEM AND METHOD FOR PERTURBED GEOLOCATION MODEL AND ORIENTATION MODEL NETWORK SIMULATION

CROSS REFERENCE TO RELATED APPLICATIONS

This application claims priority to U.S. Provisional Application Ser. No. 62/729,842, filed Sep. 11, 2018, entitled, "SYSTEM AND METHOD FOR PERTURBED GEOLOCATION MODEL AND ORIENTATION MODEL NETWORK SIMULATION."

BACKGROUND

Technical Field

This disclosure relates to a simulation tool designed for the testing and development of wireless networked communications systems which utilize geolocation information.

Related Art

Highly dynamic airborne networking equipment development requires high fidelity simulation environments so that system designs can be validated and improved. During a system simulation, units under test (UUT) are provided network traffic, geolocation data, and radio status in a deterministic manner to reflect the mission under investigation. For example, a heavily jammed radio environment would result in links between UUTs which are often failed.

SUMMARY

One aspect of the disclosure provides a method for validating a configuration-dependent algorithm of a network device under test (DUT) within a simulated wireless environment. The method can include transmitting idealized configuration information to a first DUT, the idealized configuration information including at least one of zero-error geolocation information and zero-error orientation information used to determine at least one of a position and orientation of the first DUT. The method can include the first DUT communicating first data transmissions with a second DUT based on the configuration of the first DUT. The method can include determining a first link quality between the first DUT and the second DUT based on the first data transmissions. The method can include transmitting perturbed configuration information to the first DUT, the perturbed configuration information including a nonzero-error geolocation information and nonzero-error orientation information used to determine at least one of the position and the orientation of the first DUT. The method can include the first DUT communicating second data transmissions with the second DUT based on the nonzero configuration error. The method can include determining a second link quality between the first DUT and the second DUT based on the second data transmissions. The method can include evaluating the wireless system based on a comparison of the first link quality and the second link quality.

Another aspect of the disclosure provides a system for validating a configuration-dependent algorithm of a network device under test (DUT) within a simulated wireless environment. The system can have a first DUT and a second DUT. The system can have one or more processors communicatively coupled to the first DUT and the second DUT. The one or more processors can transmit idealized configuration information to the first DUT, the idealized configuration information including at least one of zero-error geolocation information and zero-error orientation information. The one or more processors can monitor first data transmissions between the first DUT and the second DUT based on the idealized configuration information. The one or more processors can determine a first link quality between the first DUT and the second DUT based on the first data transmissions. The one or more processors can transmit perturbed configuration information to the first DUT, the perturbed configuration information including a nonzero-error geolocation information and nonzero-error orientation information used to determine at least one of the position and the orientation of the first DUT. The one or more processors can monitor second data transmissions between the first DUT and the second DUT based on the nonzero configuration error. The one or more processors can determine a second link quality between the first DUT and the second DUT based on the second data transmissions. The one or more processors can evaluate the wireless system based on a comparison of the first link quality and the second link quality.

Another aspect of the disclosure provides a non-transitory computer-readable medium comprising instructions for validating a configuration-dependent algorithm of a network device under test (DUT) within a simulated wireless environment. When executed the instructions cause the one or more processors to transmit idealized configuration information to a first DUT, the idealized configuration information including at least one of zero-error geolocation information and zero-error orientation information used to determine at least one of a position and orientation of the first DUT. The instructions further cause the one or more processors to determine a first link quality between the first DUT and the second DUT based on the first data transmissions. The instructions further cause the one or more processors to transmit perturbed configuration information to the first DUT, the perturbed configuration information including a nonzero-error geolocation information and non-zero-error orientation information used to determine at least one of the position and the orientation of the first DUT. The instructions further cause the one or more processors to monitor second data transmissions from the first DUT to the second DUT based on the nonzero configuration error. The instructions further cause the one or more processors to determine a second link quality between the first DUT and the second DUT based on the second data transmissions. The instructions further cause the one or more processors to evaluate the wireless system based on a comparison of the first link quality and the second link quality.

Another aspect of the disclosure provides a method for incorporating a geolocation notification infrastructure, for example simulated GPS, within a network discrete event simulator tool.

Another aspect of the disclosure provides a method for introducing geolocation errors into the geolocation infrastructure of a network discrete event simulator tool.

Another aspect of the disclosure provides a method for introducing independent geolocation errors along any plane independently and simultaneously during a simulation.

Another aspect of the disclosure provides a method for introducing independent geolocation errors to each device under test independently and simultaneously during a simulation.

Other features and advantages of the present disclosure should be apparent from the following description which illustrates, by way of example, aspects of the disclosure.

BRIEF DESCRIPTION OF DRAWINGS

The details of embodiments of the present disclosure, both as to their structure and operation, may be gleaned in part by study of the accompanying drawings, where like reference numerals refer to like parts, in which.

DETAILED DESCRIPTION

Figure 1:
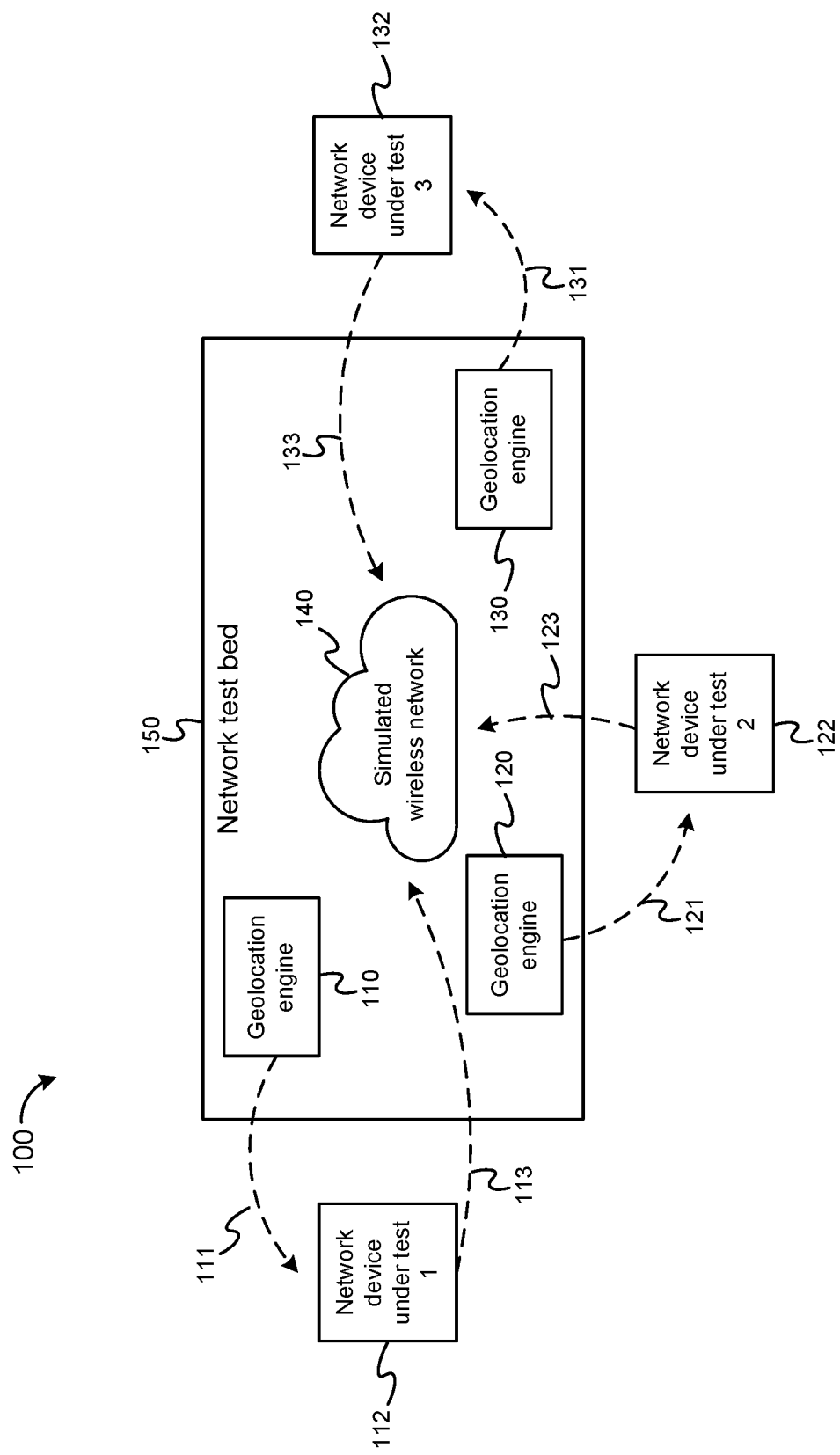
FIG. 1 is a functional block diagram of a system for testing multiple networking devices which use geolocation information.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

This disclosure describes systems and methods that allow network equipment designers to validate their position and/or orientation-dependent algorithms without fielding airborne qualified gear. Electronic network devices must be robust and able to overcome erroneous geolocation input. Geolocation or orientation input or information may contain errors due to various reasons, including intentional attempts by adversaries (e.g., GPS denial) or unintentionally due to natural errors in geolocation sensing devices.

A network device being tested, referred to herein device under test or DUT, may be subjected to one or more simulated conditions related to a device's six degrees of freedom (e.g., position and orientation) that allow developers and engineers to derive, for example, countermeasures to GPS denial attempts. Geolocation devices (e.g., networking devices) for use aboard aviation or inflight platforms are used as a primary example, but that is not limiting to the disclosure. Other systems dependent on various orientation related criteria are useful with the disclosed systems.

For positioning, there are at least six primary sources of GPS error, not including the military use case of GPS jamming/denial. These can include ionospheric effects, shifts in satellite orbits, clock error in satellite clocks, multipath effects, tropospheric effects, and rounding errors. Cumulatively, these can account for over 10 meters of error in a GPS-based position solution, which can significantly affect radiofrequency (RF) or Free Space Optic (FSO) pointing algorithms or other antenna steering methods used for directional radio communications. Thus, even the most accurate GPS position information is not free of all error and provide position information that deviates from a perfect, absolute, or idealized position.

In orientation, Inertial Navigation Systems (INS) can use motion sensors, rotation sensors, and magnetic sensors to provide orientation data (e.g., pitch, roll, and yaw) to networking devices and may be subject to jamming and errors. In airborne networking, shadow map compliance networking algorithms which consider the blockage patterns of the aircraft as well as antenna pointing require precise orientation information. The systems and methods described herein provide a simulation environment that can test, evaluate, and validate such algorithms which must remain robust against such perturbed orientation data.

Network discrete event simulation, or otherwise modeling a networked system as a discrete sequence of events, has proven to be a powerful tool for network equipment designers. These simulations can validate and test systems in high fidelity without requiring expensive networking hardware and platforms on which to deploy the hardware such as ships and aircraft. This is especially true in scenarios where expensive state-of-the-art UAV's, planes, and ships are utilized.

In general, this disclosure describes systems and methods to evaluate or validate algorithms dependent on configuration information (e.g., configuration-dependent algorithm) in wireless network simulations. As used herein, configuration information includes information related to position and orientation of a body or device. As described in the following, an exemplary device under test can be provided geolocation data (e.g. GPS) as it would receive in flight, for example. The disclosed system can artificially perturb a location or orientation solution (e.g., a position resolved through GPS location) by adding error via supplied configuration information within a simulated environment. The results can then be compared to the device under test receiving zero-error information. The ability to simulate perturbation of geolocation/orientation systems allows software and hardware developers to develop, test, and evaluate robust networking systems. This further enables development of systems with increased immunity to GPS or other position and orientation errors. Such errors include both graceful degradation and sudden failure of systems.

The systems, methods, and devices of this disclosure each have several innovative aspects, no single one of which is solely responsible for the desirable attributes disclosed herein.

FIG. 1 is a functional block diagram of an embodiment of a system for testing multiple networking devices which use geolocation information. A system for testing multiple networking devices (simulation system) 100 can have a network testbed 150. The network testbed 150 can be used to subject a one or more network device under test (DUT) 112, 122, 132 to various simulated environmental conditions. For example, the DUTs 112, 122, 132 can be a radio device having an input for a GPS device (e.g., a GPS receiver) and control of an antenna that must be pointed at another antenna to support a communication link and pass data.

The DUTs 112, 122, 132 can be various network-enabled devices or systems adapted for wireless communications or navigation. For example, a given DUT can have one or more directional antennas (e.g., an array) requiring some kind of steering mechanism or pointing algorithm in order to direct the orientation of the antennas and thus optimize wireless communications with a receiving unit. The DUTs 112, 122, 132 can each be devices that control antennas or even platform (e.g., vehicle, aircraft, etc.) movement in a geographic area. Such devices necessarily perform better with accurate location information to appropriately steer the antennas for optimum reception or navigation. In some examples, the DUTs 112, 122, 132 can be implemented as virtualized software networking device.

The network testbed 150 can have a simulated wireless network 140. Each of the DUT 112, the DUT 122, and the DUT 132 can be communicatively coupled to one another within the simulated environment via the simulated wireless network 140. The network testbed 150 can then, via the simulated wireless network 140, test capabilities and performance of the DUTs 112, 122, 132 under simulated environmental conditions. Such simulated environmental conditions can include inducing geolocation perturbation in the DUTs 112, 122, 132.

The DUTs 112, 122, 132 can be communicatively coupled to one or more geolocation engines 110, 120, 130 via a respective geolocation data link 111, 121, 131. The geolocation data link 111, 121, 131 can be, for example, an existing command/status/data link or a dedicated geolocation link (e.g., Ethernet or serial carrying NMEA or binary). As shown, the DUT 112 is coupled to the geolocation engine 110 via the geolocation data link 111, the DUT 122 is coupled to the geolocation engine 120 via the geolocation data link 121, and the DUT 130 is coupled to the geolocation engine 130 via the geolocation data link 131. The geolocation engines 110, 120, 130 can be implemented as a software process or software module implemented by a processor (e.g., the processor 304 of FIG. 3), or via various hardware features of a GPS receiver, for example. In some implementation, the geolocation engines 110, 120, 130 can perform functions similar to that of a GPS receiver/processor, in which a complete three dimensional position is provided to the respective DUT. In some other implementations, the geolocation engines 110, 120, 130 can perform functions similar to that of a GPS satellite, in which the respective DUT resolves its own position.

The geolocation engines 110, 120, 130 can supply geolocation information to a respective DUT 112, 122, 132. The geolocation information can include zero-error information (e.g., specific geographic coordinates), or nonzero error information otherwise referred to as perturbed geolocation information. The perturbed geolocation information can include a location or position with varying levels of precision or accuracy. As used herein, position can refer to a three dimensional position, for example, expressed in terms of x, y, z coordinates in Cartesian three space (e.g., a GPS position). A body can translate from a three dimensional position, or surge, heave, and sway in three orthogonal axes (e.g., x, y, z axes). Together, the position (on the x, y, z axes) and orientation described below (pitch, roll, yaw about the position) are referred to as the six degrees of freedom.

In some examples, the geolocation engine 110 can have one or more processors that can provide geolocation information to DUT 112 via the geolocation data link 111. The DUT 112 can use this geolocation information to optimize communication via the data/control/status (DCS) line 113 across the simulated wireless network 140, via for example, a directional antenna or array.

The geolocation engine 120 can be similar to the geolocation engine 110 and provide geolocation information to DUT 122 via the geolocation data link 121. The DUT 122 can use this geolocation information to optimize communication via the DCS line 123 across the simulated wireless network 140.

The geolocation engine 130 can be similar to the geolocation engines 110, 120 and provide geolocation information to DUT 132 via the geolocation data link 131. The DUT 132 can use this geolocation information to optimize communication via the DCS line 133 across the simulated wireless network 140.

Data transfer between the DUTs 112, 122, 132 can occur across the DCS lines 113, 123, 133 within the simulated wireless network 140. Only the three DUTs 112, 122, 132 are depicted however the number is not limiting on the disclosure. The methods and systems disclosed herein can implement any number of devices under test.

The networking algorithms which run on the DUTs 112, 122, 132 may have many geolocation-dependent (e.g., configuration-dependent) features such as antenna pointing/steering, waveform modification, proactive routing algorithms, and various navigational features (e.g., some level of platform control such as direction a vehicle is moving, or an aircraft is flying). These functions are dependent on accurate geolocation information. For example, if the DUT 112 does not have accurate geolocation information, then its antenna pointing algorithm can cause a respective antenna to be pointed in a sub-optimal direction. As a result, communications will be negatively impacted. Thus, the data, or the transfer rate of the data as affected by geolocation perturbations, and therefore the effectiveness of the communication of the DUTs 112, 122, 132 over the respective data links (e.g., DCS lines 113, 123, 133), can provide a metric by which the effectiveness of a respective geolocation-dependent feature can be measured or evaluated.

The geolocation engines 110, 120, 130 (e.g., software modules) can provide geolocation information according to the master Discrete Event Simulation where the data is affected according to the conditions imposed by the simulated wireless network 140. As discrete event simulations transition from time step to time step the state of the network will be governed by the physics and current status of the network including protocols and test traffic generated. The physical configuration of the networking device under test (six degree of freedom status) is important in such wireless simulations due to platform blockage, external multipath reflection, antenna pointing, and RF airborne attenuation.

According to an exemplary simulation, the geolocation engines 110, 120, 130 can intentionally provide erroneous geolocation information to the DUTs 112, 122, 132. In some embodiments, the geolocation information can be perturbed so that the DUT 112, 122, 132 (e.g., a networking device) receives inaccurate information related to their respective locations within the simulation.

For example, real world wireless communication between the two networking devices (e.g., the DUT 112 and the DUT 122) may experience low attenuation because (in reality) their positions are very close to each other thus placing their antennas in close proximity to one another. However, in the simulated environment 140, the geolocation engines 110 and 120 can provide erroneous geolocation information to the DUT 112 and the DUT 122. This simulation can force a situation in which their respective location solutions are far apart, degrading communications. In some embodiments, this type of information could cause the DUTs 112 and/or the DUT 122 to select a more robust wireless modulation and coding scheme (MCS) for communications within the simulated wireless network 140. The lower MCS can have a low bit rate instead of a higher order, or more fragile modulation scheme which has higher bit rate that can be more susceptible to GPS denial. This can result in sub-optimal network operations since the data rate between the DUT 112 and the DUT 122 would be much lower than if the DUT 112 and the DUT 122 were receiving correct geolocation data.

Network device designers must develop devices which can handle this sort of issue. Therefore simulating such degradations can be advantageous to improve designs by, for example, exposing weaknesses of a given design or testing various modifications before actually deploying the system. All of this can be coordinated inside the network testbed 150 by providing a system wide scenario to inject the correct perturbations since testbed 150 controls all of the physical configuration information provided to the DUT's. Network testbed 150 may be running on a processor which has physical interfaces to the network devices under test or network testbed 150 may connect to virtual network device software modules which may or may not run on the same processor as 150.

Figure 2:
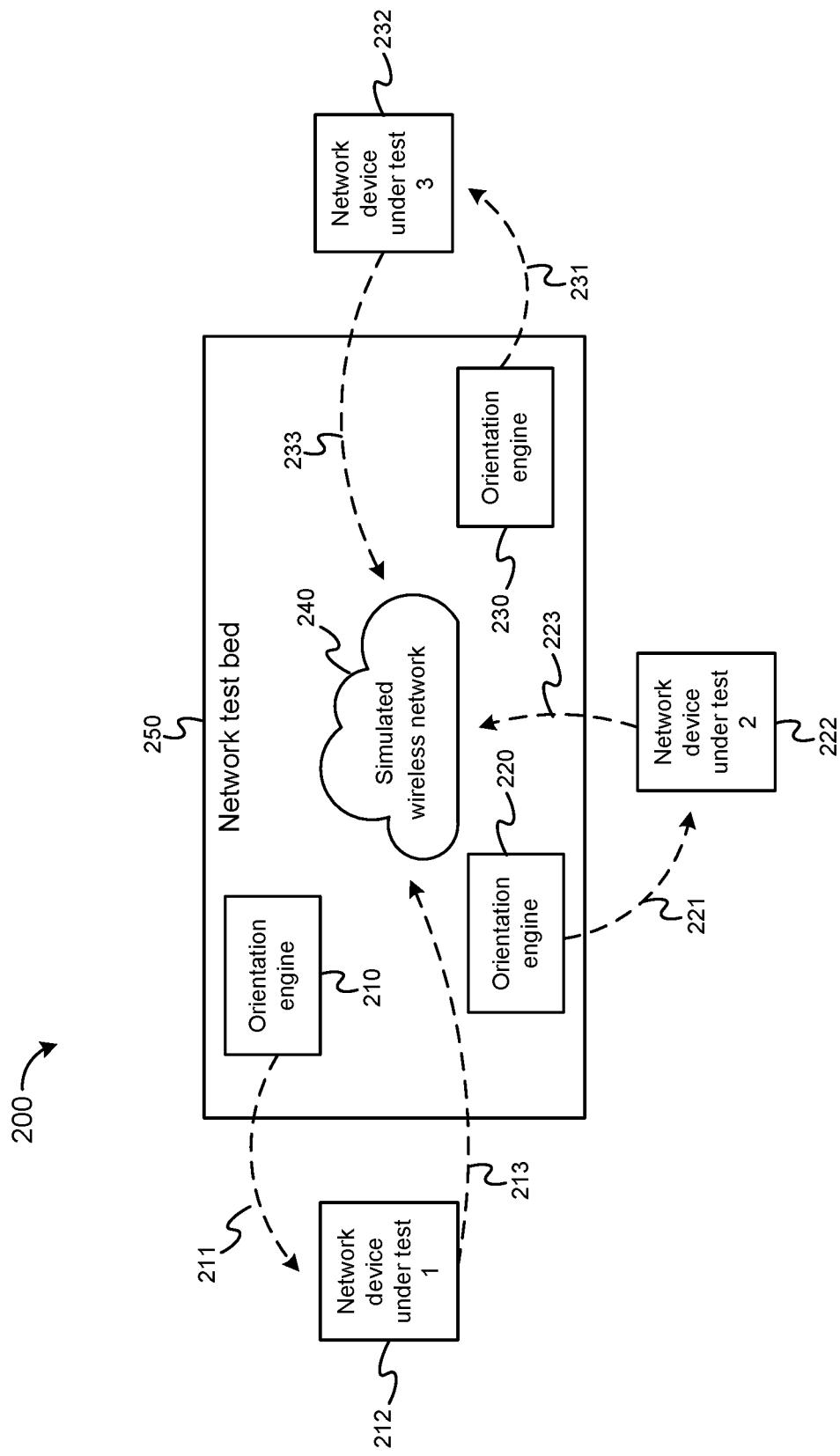
FIG. 2 is a functional block diagram of a system for testing multiple networking devices which use orientation information.

FIG. 2 is a functional block diagram of a system for testing multiple networking devices which use orientation information. A system for testing multiple networking devices (simulation system) 200 can be similar to the simulation system 100 (FIG. 1). The simulation system 200 can include a network testbed 250 implementing a simulated wireless network 240 in a simulated wireless environment. The simulated wireless network 240 can be similar to the simulated wireless network 140. The network testbed 250 can be communicatively coupled to one or more DUT 212. Three DUTs 212, 222, 232 are shown, but this is not limiting as any number of DUTs can be tests. The DUTs 212, 222, 232 can be systems or subsystems used to control antennas or platform geographic movement, similar to the DUTs 112, 122, 132.

The simulation system 200 can further have orientation engines 210, 220, 230 communicatively coupled to the DUTs 212, 222, 232 via orientation data links 211, 221, 231 as part of the simulated wireless network 240. The orientation engines 210, 220, 230 can each have one or more processors, a memory and associated circuitry adapted to perform the functions described herein. The DUTs 212, 222, 232 can further be communicatively coupled to the simulated wireless network 240 and thus communicate with one another (e.g., data transfer between the DUTs) via respective data links 213, 223, 233.

The network testbed 250 can utilize orientation information from the orientation engines 210, 220, 230 (e.g., software modules) included within the network testbed 250, coordinated with the master Discrete Event Simulation. The networking algorithms which performed on the DUTs 212, 222, 232 can have orientation-dependent features such as antenna pointing, shadow map compliance, and possibly varying levels of platform control, similar to above. While this disclosure relates to any number of devices under test the depicted example scenario demonstrates the particular case where there are three DUTs 212, 222, 232.

Orientation refers to an angular tilt or rotation, at a point (or position) about the three axes in space. Orientation is commonly expressed in terms of pitch, roll, and yaw (e.g., about a position on the x, y, z, axes). Together the position (on the x, y, z axes) and orientation (pitch, roll, yaw about the position) are referred to as the six degrees of freedom. The orientation engines 210, 220, 230 can provide perturbed orientation information with varying levels of precision or accuracy to the DUTs 212, 222, 232 via the orientation data links 211, 221, 231. As with the perturbed geolocation information, the perturbed orientation information can affect communications among the DUTs 212, 222, 232.

The orientation information being provided by the orientation engine may be perturbed so that the networking device receives or determines an inaccurate view of their (three dimensional) orientation in the simulation. For example, the orientation of the platform carrying the DUT 212 may be such that the antenna associated with the link 213 cannot be used to communicate with device 222. However, the orientation engine 210 could be providing errored orientation information to the DUT 212 so it believes it can communicate with the DUT 222.

The system 200 can be used to test and evaluate networking devices (e.g., the DUTs 212, 222, 232) that implement interfaces for an inertial navigation system (INS) or other star trackers to provide orientation and navigational tracking.

Figure 3:
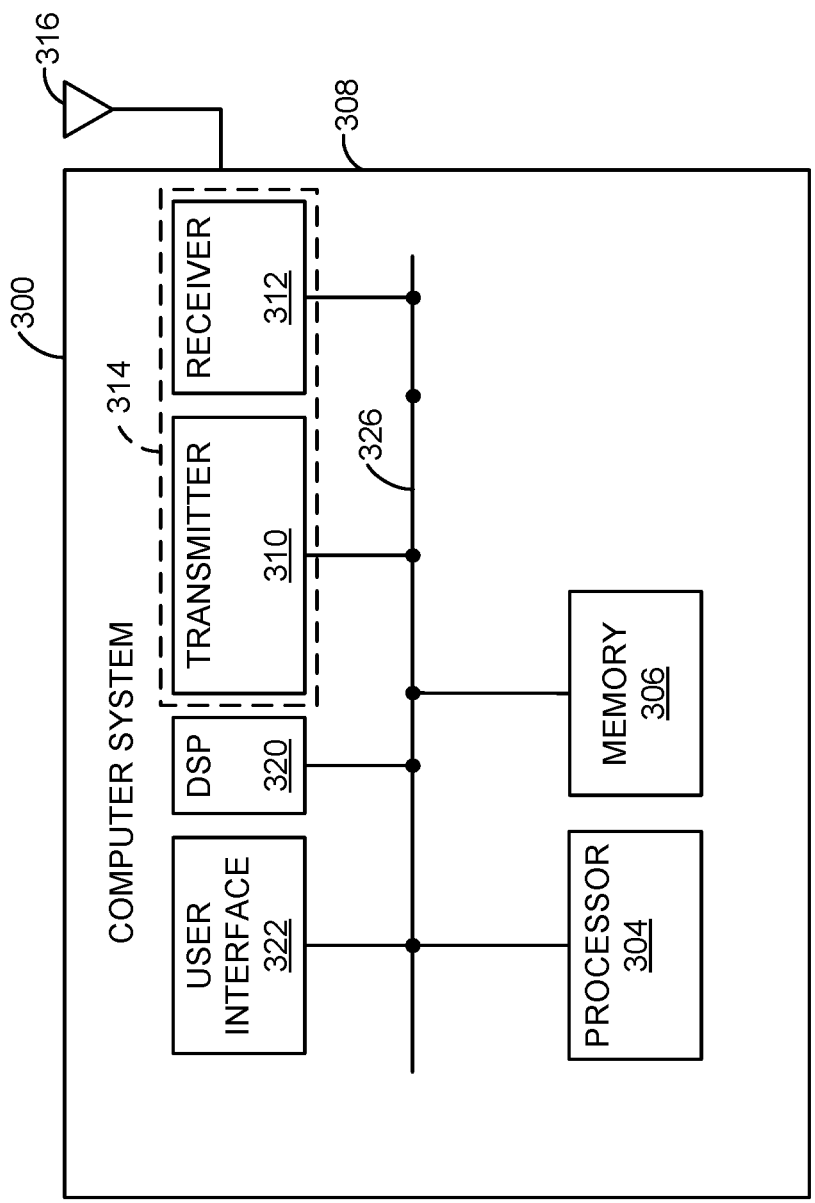
FIG. 3 is a functional block diagram of a device that may be employed within the simulator system of FIG. 1 and the simulator system of FIG. 2.

FIG. 3 is a functional block diagram of a device that may be employed within the simulator system 100 of FIG. 1 and the simulator system 200 of FIG. 2. As shown, a communication device (device) 300 may be implemented as, for example, one or more of the network devices under test (e.g., the DUTs 112, 122, 112, 132, 212, 222, 232). The device 300 can also be implemented as the network test bed 150 and the network test bed 250 of FIG. 1 and FIG. 2. The device 300 can perform the processes and methods disclosed herein related to test and evaluation of geolocation dependent processes within the various networking devices (e.g., the DUTs 112, 122, 112, 132, 212, 222, 232).

The device 300 can include a processor 304 which controls operation of the communication device 300. The processor 304 may also be referred to as a central processing unit (CPU). The communication device 300 may further include a memory 306 operably connected to the processor 304, which may include both read-only memory (ROM) and random access memory (RAM), providing instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may have one or more modules configured to implement various processes or methods in certain switching operations during transmission or signal combination operations during reception. The modules may perform the tasks of the geolocation engines 120, 130 and/or the orientation engines 220, 230.

The processor 304 may comprise or be a component of a processing system implemented with one or more processors 304. The one or more processors 304 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 304 may also include machine-readable media for storing software to perform the various tasks associated with the network test bed 150 and the network test bed 250. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 304, cause the processing system to perform the various functions described herein.

The communication device 300 may also include a housing 308 that may include a transmitter 310 and a receiver 312 to allow transmission and reception of data between the communication device 300 and a remote location. For example, such communications may occur between the network devices under test 112, 122, 132, for example. The transmitter 310 and receiver 312 may be combined into a transceiver 314 at an antenna site. An antenna 316 may be attached to the housing 308 and electrically coupled to the transceiver 314 or to the transmitter 310 and the receiver 312 independently. The communication device 300 may also include (not shown) multiple transmitters, multiple receivers, multiple transceivers, and/or multiple antennas. In some embodiments, the transmitter 310, the receiver 312, and the antenna 316 can also perform some or all of the data transmission or communication functions associated with the various devices disclosed herein.

The communication device 300 may also include a digital signal processor (DSP) 320 for use in processing signals. The DSP 320 may be configured to generate a data unit for transmission. In some embodiments, the DSP 320 may be contained within the processor 304.

The communication device 300 may further comprise a user interface 322. The user interface 322 may comprise a keypad, a microphone, a speaker, and/or a display. The user interface 322 may include any element or component that conveys information to a user of the communication device 300 and/or receives input from the user.

Figure 4:
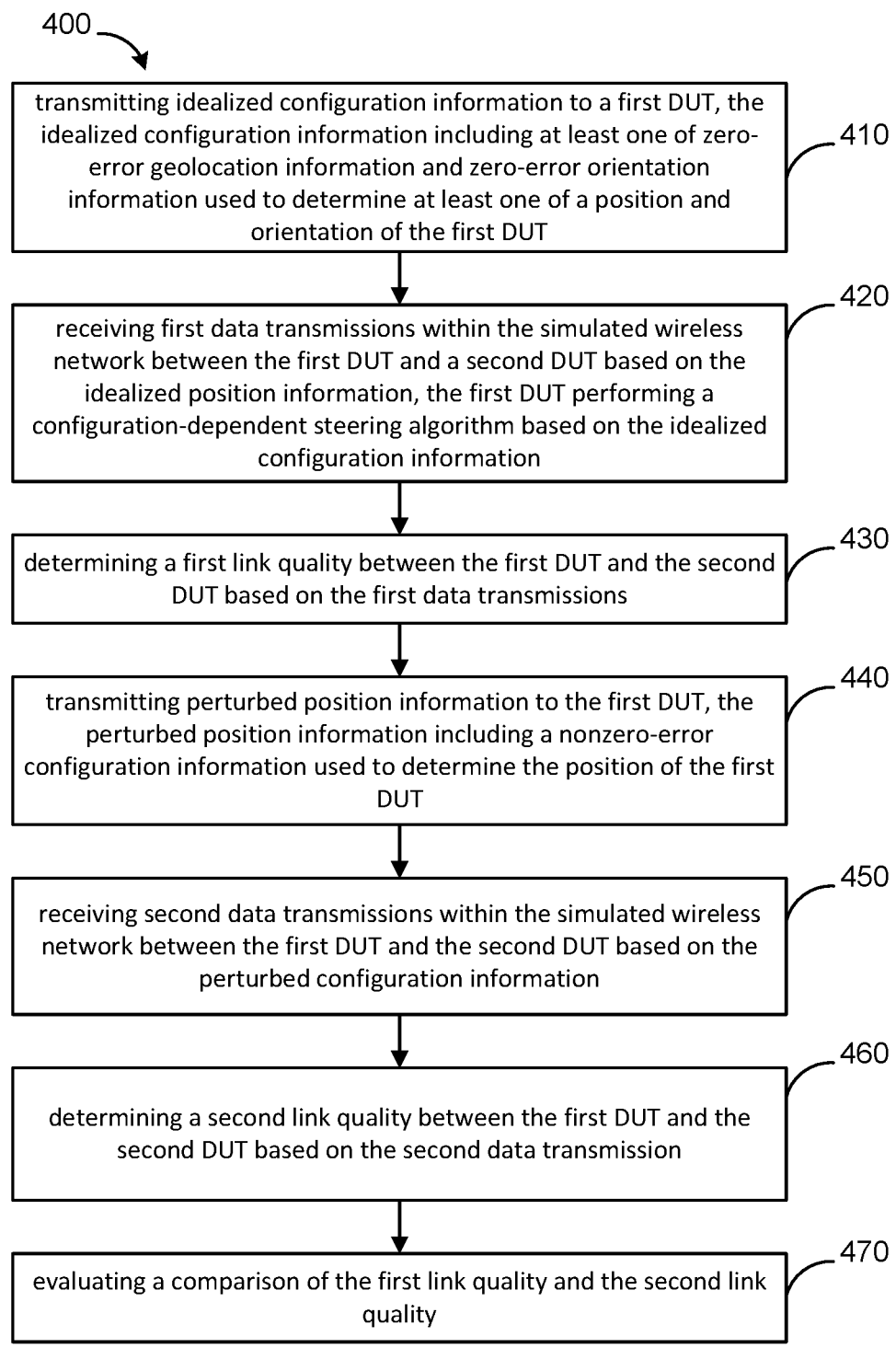
FIG. 4 is a flowchart of an embodiment of a method for validating position- and orientation-dependent processes in the wireless communication systems of FIG. 1 and FIG. 2.

FIG. 4 is a flowchart of an embodiment of a method for validating position- and orientation-dependent processes in the wireless communication systems of FIG. 1 and FIG. 2. The processor 304 implemented as the network testbed 150 or the network testbed 250 can execute a method 400 to test and evaluate the robustness of, for example, geolocation-dependent (e.g., position) or orientation-dependent algorithms implemented by the DUTs 112, 122, 132 or the DUTs 212, 222, 232.

At block 410, the processor 304 can transmit or otherwise provide idealized configuration information to a first DUT (e.g., one of the DUTs 112, 122, 132, 212, 222, 232). The configuration information refers to information or data related to the six degrees of freedom of the DUT, for example, including information related to the DUT position (e.g., x, y, z) and orientation (e.g., pitch, roll, yaw). The idealized configuration information can include zero geolocation error and/or zero orientation error used to determine a position and orientation (configuration) of the first DUT. Communications and more particularly data transfer rates based on the zero-error configuration can serve as a control or baseline for later comparison. As used herein, zero-error configuration can be an absolute or ground truth position and orientation having zero or negligible error. For example, even precise geolocation systems such as GPS can have some position error. The zero-error configuration information can eliminate (or render negligible) even that small error (e.g., within the simulated environment). The geolocation engines 110, 120, 130 and the orientation engines 210, 220, 230 can provide zero-error configuration (e.g., geolocation and orientation) information to the DUTs 112, 122, 132, 212, 222, 232.

At block 420, the processor 304 (e.g., the network testbed 150, 250) can receive first data transmissions within the simulated wireless network 140 between the first DUT and a second DUT based on the idealized configuration information. As noted above, the first DUT can execute an antenna steering algorithm, or other position- or orientation-based function (e.g., a configuration-dependent algorithm or process) using on the idealized configuration information.

At block 430, the processor 304 can determine a first link quality between the first DUT and the second DUT based on the first data transmissions. In the example of an antenna steering algorithm, communications based on the zero-error configuration information should have the highest data transfer rates (e.g., throughput) because there is no error in the position solutions for either the first DUT or the second DUT. The same is true for orientation-based communication or navigation. The first link quality can be recorded, for example, in terms of a received signal strength indicator (RSSI) an amount of or rate of data transferred (e.g., bits, bits/sec). The processor 304 can record the actual position and orientation in a simulation log for later reference and analysis.

At block 440, the processor 304 can provide perturbed configuration information to the first DUT and the second DUT. As used herein, the perturbed configuration information includes inserting a nonzero geolocation error and/or nonzero orientation error used to determine the position and orientation of the first DUT and the second DUT. The nonzero geolocation error or nonzero orientation error can be introduced deterministically or randomly, for example. In some implementations, the system can be evaluated deterministically ($\Delta X=0.010$). In some other implementations, the system can be evaluated non-deterministically or randomly $\Delta X=N(\mu,\sigma^2)$ (e.g., Normal random variable). This can include positioning errors generated in a GPS position solution or INS position solution.

In some embodiments, perturbations to the position or orientation information (e.g., the perturbed position information) can be governed by equation (1):

$$X_i^R(t)=X_i^A(t)+\Delta X_i \qquad (1)$$

In equation (1), $X_i^A(t)$ represents the actual position of platform (node) i at time t and $X_i^R(t)$ represents the position reported to the network device on platform i at time t via the geolocation reporting mechanism perturbed by $\Delta X_i(t)$.

At block 450, the processor 304 can receive second data transmissions within the simulated wireless network between the first DUT and the second DUT based on the perturbed configuration information. The first DUT and the second DUT can then perform their position/geolocation-based functions based on the non-zero error positioning/orientation information.

At block 460, the processor 304 can determine a second link quality between the first DUT and the second DUT based on the second data transmissions. Because the configuration information has some error, the link quality or transfer rate should also experience negative effects. The link quality or transfer rate should be diminished in comparison to the first link quality based on the zero-error position information. The second link quality based on, for example, a GPS position or INS-based position should necessarily be lower than the first link quality. The second link quality can be recorded, for example, in terms of RSSI or an amount of or rate of data transferred (e.g., bits, bits/sec). The processor 304 can record the perturbed position/orientation $X_i^R(t)$ in the simulation log for later reference and analysis.

At block 470, the method 400 can include evaluating the first link quality and the second link quality to determine where modifications to the position-dependent processes are needed. In some embodiments, in block 470 the processor 304 can further determine a validation factor of the antenna steering algorithm based on a comparison of the first link quality and the second link quality. The validation factor is a measurement of the effect (e.g., diminished link quality)

produced by the nonzero error position information. The validation factor can provide a metric used to evaluate reactions or compensation of the DUT (e.g., the first DUT and the second DUT) for diminished communications based on the erroneous position information.

In some embodiments, the strength of the signal on the link (e.g., Received Signal Strength Indication or RSSI) at the physical layer (PHY) can serve as such a measurement. In some other embodiments, another measurement or metric can be an amount of data passed over the link at the protocol level. Such measurements can serve as a factor or metric used to evaluate the link quality. Such evaluation can be done automatically (e.g., by processor 304) or manually by a system engineer, for example. If the measurement is not acceptable then the system engineer could adjust many different parameters to improve performance, (e.g., improve the geolocation algorithm, adjust forward error correction levels, modify antennas being used, or many other techniques.)

Other Aspects

The various components of the communication device 300 described herein may be coupled together by a bus system 326. The bus system 326 may include a data bus, for example, as well as a power bus, a control signal bus, and a status signal bus in addition to the data bus. Those of skill in the art can appreciate the components of the communication device 300 may be coupled together or accept or provide inputs to each other using some other mechanism.

Although a number of separate components are illustrated in FIG. 3, one or more of the components may be combined or commonly implemented. For example, the processor 304 may be used to implement not only the functionality described above with respect to the processor 304, but also to implement the functionality described above with respect to the DSP 320, for example. Further, each of the components illustrated in FIG. 3 may be implemented using a plurality of separate elements. Furthermore, the processor 304 (or one or more processors) may be used to implement any of the components, modules, circuits, or the like described herein, or each may be implemented using a plurality of separate elements.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry, as described in connection with FIG. 1. and FIG. 2. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although embodiments of the invention are described above for particular embodiment, many variations of the invention are possible. For example, the numbers of various components may be increased or decreased, modules and steps that determine a supply voltage may be modified to determine a frequency, another system parameter, or a combination of parameters. Additionally, features of the various embodiments may be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module or block is for ease of description. Specific functions or steps can be moved from one module or block or distributed across to modules or blocks without departing from the invention.

The above description of the disclosed embodiment is provided to enable any person skilled in the art to make or use the invention. Various modifications to these embodiments will be readily apparent to those skilled in the art, and the generic principles described herein can be applied to other embodiment without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other embodiment that may become obvious to those skilled in the art and that the scope of the present invention is accordingly limited by nothing other than the appended claims.

What is claimed is:

1. A method for validating a configuration-dependent algorithm of a network device under test (DUT) within a simulated wireless environment, the method comprising:
transmitting idealized configuration information to a first DUT, the idealized configuration information including at least one of zero-error geolocation information and zero-error orientation information used to determine at least one of a position and orientation of the first DUT;
the first DUT communicating first data transmissions with a second DUT based on a configuration of the first DUT;
determining a first link quality between the first DUT and the second DUT based on the first data transmissions;
transmitting perturbed configuration information to the first DUT, the perturbed configuration information including a nonzero-error geolocation information and nonzero-error orientation information used to determine at least one of the position and the orientation of the first DUT;
the first DUT communicating second data transmissions with the second DUT based on the nonzero configuration error;
determining a second link quality between the first DUT and the second DUT based on the second data transmissions;
evaluating the wireless system based on a comparison of the first link quality and the second link quality.

2. The method of claim 1, further comprising determining a validation factor of the configuration-dependent algorithm based on a comparison of the first link quality and the second link quality.

3. The method of claim 1, wherein the configuration-dependent algorithm is one of an antenna steering algorithm, a waveform modification algorithm, a proactive routing algorithm, and a platform control algorithm.

4. The method of claim 1, wherein the perturbed configuration information is defined by:

$$X_i^R(t)=X_i^A(t)+\Delta X_i(t)$$

where $X_i^A(t)$ represents the actual position of platform (node) i at time t and $X_i^R(t)$ represents the position reported to the network device on platform i at time t via the geolocation reporting mechanism perturbed by $\Delta X_i(t)$.

5. The method of claim 1, wherein the nonzero configuration error is introduced deterministically.

6. The system and method of claim 1, where the nonzero configuration error are introduced randomly.

7. The method of claim 1, wherein the nonzero geolocation error comprises one or more geolocation error in any plane independently and simultaneously.

8. The method of claim 1, further comprising transmitting the nonzero configuration error to the first DUT and the second DUT independently and simultaneously.

9. A system for validating a configuration-dependent algorithm of a network device under test (DUT) within a simulated wireless environment, the system comprising:
a first DUT;
a second DUT communicatively coupled with the first DUT and configured to communicate with the first DUT; and
one or more processors communicatively coupled to the first DUT and the second DUT and configured to
transmit idealized configuration information to the first DUT, the idealized configuration information including at least one of zero-error geolocation information and zero-error orientation information,
monitor first data transmissions between the first DUT and the second DUT based on the idealized configuration information,
determine a first link quality between the first DUT and the second DUT based on the first data transmissions,
transmit perturbed configuration information to the first DUT, the perturbed configuration information including a nonzero-error geolocation information and nonzero-error orientation information used to determine at least one of the position and the orientation of the first DUT,
monitor second data transmissions between the first DUT and the second DUT based on the nonzero configuration error,
determine a second link quality between the first DUT and the second DUT based on the second data transmissions, and
evaluate the wireless system based on a comparison of the first link quality and the second link quality.

10. The system of claim 9, wherein the one or more processors is further configured to determine a validation factor of the configuration-dependent algorithm based on a comparison of the first link quality and the second link quality.

11. The system of claim 9, wherein the configuration-dependent algorithm is one of an antenna steering algorithm, a waveform modification algorithm, a proactive routing algorithm, and a platform control algorithm.

12. The system of claim 9, wherein the perturbed configuration information is defined by:

$$X_i^R(t)=X_i^A(t)+\Delta X_i(t)$$

where $X_i^A(t)$ represents the actual position of platform (node) i at time t and $X_i^R(t)$ represents the position reported to the network device on platform i at time t via the geolocation reporting mechanism perturbed by $\Delta X_i(t)$.

13. The system of claim 9, wherein the nonzero configuration error is introduced deterministically.

14. The system of claim 9, wherein the nonzero configuration error is introduced randomly.

15. The system of claim 9, wherein the nonzero geolocation error comprises one or more geolocation error in any plane independently and simultaneously.

16. The system of claim 9, wherein the one or more processors is further configured to transmit the nonzero configuration error to the first DUT and the second DUT independently and simultaneously.

17. A non-transitory computer-readable medium comprising instructions for validating a configuration-dependent algorithm of a network device under test (DUT) within a simulated wireless environment, that when executed by one or more processors cause the one or more processors to:

transmit idealized configuration information to a first DUT, the idealized configuration information including at least one of zero-error geolocation information and zero-error orientation information used to determine at least one of a position and orientation of the first DUT;

determine a first link quality between the first DUT and the second DUT based on the first data transmissions;

transmit perturbed configuration information to the first DUT, the perturbed configuration information including a nonzero-error geolocation information and nonzero-error orientation information used to determine at least one of the position and the orientation of the first DUT;

monitor second data transmissions from the first DUT to the second DUT based on the nonzero configuration error;

determine a second link quality between the first DUT and the second DUT based on the second data transmissions;

evaluate the wireless system based on a comparison of the first link quality and the second link quality.

18. The non-transitory computer-readable medium of claim 17 further comprising instructions to cause the one or more processors to determine a validation factor of the configuration-dependent algorithm based on a comparison of the first link quality and the second link quality.

19. The non-transitory computer-readable medium of claim 17, wherein the configuration-dependent algorithm is one of an antenna steering algorithm, a waveform modification algorithm, a proactive routing algorithm, and a platform control algorithm.

20. The non-transitory computer-readable medium of claim 17, wherein the perturbed configuration information is defined by:

$$X_i^R(t) = X_i^A(t) + \Delta X_i(t)$$

where $X_i^A(t)$ represents the actual position of platform (node) i at time t and $X_i^R(t)$ represents the position reported to the network device on platform i at time t via the geolocation reporting mechanism perturbed by $\Delta X_i(t)$.

* * * * *